Patented Sept. 29, 1936

2,055,685

UNITED STATES PATENT OFFICE 2,055,685

PURIFICATION OF DYESTUFFS

Lawrence H. Flett, Hamburg, N. Y., assignor to National Aniline & Chemical Company, Inc., New York, N. Y., a corporation of New York No Drawing. Application March 7, 1934, Serial No. 714,459

14 Claims. (Cl. 260—64)

This invention relates to the purification of dyestuffs. It relates more particularly to the treatment of dyestuffs for the removal of impurities which interfere with the coloring properties of the dyestuffs, for example, by reducing the solubility of the dyestuff, by decreasing the dischargeability of dyeings produced with the dyestuff, by causing dullness of dyeings, lakes or solutions made with the dyestuff, etc.

According to the present invention a dyestuff containing impurities which interfere with the dyeing or lake-forming properties of the dyestuff, or with the brilliancy of its color in solution, is treated in the form of a solution with a highly porous, solid adsorbent, and the treated solution is separated from the adsorbent, as for example, by filtration, centrifugal separation, etc. The dyestuff may then be recovered from the resulting solution. I have found, that as a result of the treatment, the said impurities are removed from the dyestuff, whereby its utility as a dyestuff is enhanced.

The invention will be illustrated by the following specific example in which the parts are by weight and temperatures are in degrees centigrade. It will be realized by those skilled in the art that the invention is not limited thereto, however, except as indicated in the appended patent claims.

*Example 1.*—80 parts of auramine hydrochloride ("Colour Index" No. 655), obtained in accordance with the known process by the interaction of tetramethyl-diamino-diphenylmethane, ammonia, sulfur, ammonium chloride, and sodium chloride, are dissolved in 2500 parts of water. To the solution there are added 3 parts of a highly active adsorbent charcoal derived from willow wood (e. g., that known in the trade as "Norit") in the form of a powder. (If the "Norit" produces an alkaline reaction when added to water, it is preferably neutralized before use.) The mixture is heated with agitation to about 80°, the period of heating being about 5 to 10 minutes. The hot solution is filtered from the charcoal and then cooled rapidly to room temperature. Auramine hydrochloride is recovered from the solution in a purified condition by adding common salt (NaCl) to the cooled solution, and separating the precipitated auramine hydrochloride by filtration. As compared with the original material employed, the auramine hydrochloride thus obtained produces dyeings on paper of superior brightness and its solubility in water is greater. While the exact nature of the impurities removed by the charcoal is not known, they appear to be basic substances of a tarry nature and relatively insoluble in water.

The invention is not limited to the foregoing specific example but may be employed for the treatment of dyestuffs of various types to improve the dyeing properties thereof. As additional illustrative specific instances of dyestuffs which may be purified in accordance with the present invention, there may be mentioned Serichrome Blue ("Colour Index" No. 180), Red G Salt New Schultz No. 86), Alizarine Blue SE ("Colour Index" No. 1053) and Orange II ("Colour Index" No. 151).

The dyestuff may be treated in the form of a solution in any suitable solvent which should preferably not be a solvent for the impurities. The purification may be carried out during the course of manufacture of the dyestuff, as well as by the treatment of the dyestuff in the form of a manufactured product. Thus, a solution of the dyestuff as produced during the course of its manufacture may be treated with the adsorbent in accordance with the present invention, and the dyestuff may then be isolated therefrom in a purified condition, as for example, by salting out, evaporation, etc. It will furthermore be understood by those skilled in the art that the purification treatment also may be employed in conjunction with the dyeing process in which the dyestuff is employed; as for example by treating a dye bath of the impure dyestuff with the adsorbent and employing the treated dye bath in the dyeing process, preferably after separating the adsorbent containing impurities from the treated dye bath.

Instead of the adsorbent charcoal of the above example, other highly porous, solid adsorbents may be employed, such as other active adsorbent carbons of animal or vegetable origin—including other highly active vegetable charcoals useful as adsorbents in gas masks, vapor recovery processes and the like (and known in the trade as "Nuchar", "Darco", etc.), bone black and other animal charcoals—silica gel, aluminum oxide gel, and the like. In general, the adsorbent carbons are preferred. The adsorbent may be in the form of a powder, lumps or granules. The amount of adsorbent employed is obviously not limited to the specific amounts given in the foregoing examples. Ordinarily about 5 per cent of the adsorbent, based on the weight of the dyestuff treated, is sufficient to effect a purification. In some cases, however, a greater amount may be necessary. It is to be noted that in some cases the use of the adsorbent may result in some loss of the dyestuff by retention of the solution in the adsorbent, and hence for economical operation an unnecessary excess of adsorbent should be preferably avoided. If desired the purification may be effected by repeated treatment with small amounts of the same or different adsorbents.

If desired a filter-aid may be employed in conjunction with the adsorbent, especially when the treatment results in solutions which are difficult to filter, to aid in the separation of the adsorbent and impurities from the solution; as for example, "Filter-cell", kieselguhr and the like. Thus, in the above example, "Filter-cell" may be added to the treated solution prior to the removal of the active charcoal by filtration.

The treatment may be carried out at ordinary temperatures or with the aid of heating. Heating is preferably employed inasmuch as it appears to increase the rapidity of the removal of impurities and facilitates removal of the powdered adsorbent from the treated solution by filtration. The particular temperature employed will depend upon the nature of the dyestuff. In the case for example of auramine hydrochloride, which is sensitive to water at high temperatures, the temperature of the treatment is preferably not above 80° C. In the case of less sensitive dyestuffs the solution may be boiled.

Without limiting my invention to any particular theoretical consideration, it appears probable that the impurities which interfere with the utility as dyestuffs of impure dyestuffs are of the nature of compounds which are soluble and insoluble, although in general they are sparingly soluble, in the solvents for the dyestuff but separate with the dyestuff when the dyestuff is isolated in the course of its manufacture. It appears that by the treatment of a solution of the dyestuff with the adsorbent the said impurities are adsorbed or absorbed whereas the dyestuff mainly remains in solution in the solvent; so that upon separation of the treated solution of the dyestuff from the adsorbent, purification of the dyestuff is effected.

I claim:

1. A method of purifying a dyestuff containing impurities which interfere with the coloring properties thereof, comprising the step of treating a solution of the impure dyestuff in a solvent in which the impurities are less soluble than the dyestuff with a highly porous, solid adsorbent.

2. A method of purifying a dyestuff containing impurities which interfere with the coloring properties thereof comprising the step of treating a solution of the impure dyestuff in a solvent in which the impurities are less soluble than the dyestuff with an active carbon adsorbent.

3. A method of purifying a water soluble dyestuff containing impurities which interfere with the coloring properties thereof, comprising the step of treating a solution of the impure dyestuff in water with a highly porous, solid adsorbent.

4. A method of purifying a dyestuff containing impurities of a tarry nature which interfere with the coloring properties thereof, comprising treating a solution of the impure dyestuff in a solvent in which the impurities are less soluble than the dyestuff with a highly porous, solid adsorbent and separating the treated solution from the adsorbent.

5. A method of purifying a water soluble dyestuff containing impurities which interfere with the coloring properties thereof, comprising treating an aqueous solution of the impure dyestuff with a highly active adsorbent carbon and separating the treated solution from the adsorbent.

6. A method of purifying a water soluble dyestuff containing impurities which interfere with the coloring properties thereof, comprising heating a solution of the impure dyestuff in water with a highly porous, solid adsorbent, separating the treated solution from the adsorbent, and recovering the dyestuff in a purified condition from the solution.

7. A method of purifying a water soluble dyestuff containing impurities which interfere with the coloring properties thereof, comprising heating a solution of the impure dyestuff in water with an active carbon adsorbent in an amount sufficient to remove said impurities, separating the treated solution from the adsorbent, and salting out the dyestuff from the resulting solution.

8. A method of purifying a water soluble dyestuff containing impurities which interfere with the coloring properties thereof, comprising heating a solution of the impure dyestuff in water with a highly active vegetable charcoal adsorbent in an amount sufficient to remove said impurities, separating the treated solution from the adsorbent, and salting out the dyestuff from the resulting solution.

9. A method of purifying an auramine dyestuff containing impurities which interfere with its coloring properties, comprising heating a solution of the impure dyestuff in water with a highly porous, solid adsorbent at a temperature not exceeding 80° C.

10. A method of purifying an auramine dyestuff containing basic impurities of a tarry nature which interfere with its coloring properties, comprising heating a solution of the impure dyestuff in water with a highly active vegetable charcoal adsorbent in an amount sufficient to remove said impurities, at a temperature of about 80° C., separating the treated solution from the adsorbent, and salting out the dyestuff from the resulting solution.

11. A method of purifying a dyestuff containing a relatively small proportion of impurities which interfere with the coloring properties thereof, comprising the step of treating a solution of the impure dyestuff in a solvent in which the impurities are less soluble than the dyestuff with an amount of a highly porous, solid adsorbent sufficient to remove the impurities but insufficient to remove a substantial amount of the dyestuff.

12. A method of purifying a water-soluble dyestuff containing a relatively small proportion of impurities which interfere with the coloring properties thereof, comprising the step of treating an aqueous solution of the impure dyestuff with an amount of an active carbon adsorbent sufficient to remove the impurities but insufficient to remove a substantial amount of the dyestuff.

13. A method of purifying auramine containing impurities which interfere with its coloring properties and which are present as a result of the manufacture of the auramine from tetramethyl-diamino-diphenylmethane, which comprises treating an aqueous solution of the impure auramine with an amount of a highly porous, solid adsorbent sufficient to remove the impurities but insufficient to remove a substantial amount of the auramine.

14. A method of purifying auramine containing impurities which interfere with its coloring properties and which are present as a result of the manufacture of the auramine from tetramethyl-diamino-diphenylmethane, which comprises heating an aqueous solution of the impure auramine with not more than about 5 per cent, based on the weight of the auramine, of a highly active vegetable charcoal adsorbent, and separating the treated solution from the adsorbent.

LAWRENCE H. FLETT.